United States Patent
Ho et al.

(10) Patent No.: US 10,108,298 B2
(45) Date of Patent: Oct. 23, 2018

(54) PORTABLE ELECTRONIC DEVICE AND TOUCH CONTROL CHIP AND TOUCH CONTROL METHOD THEREOF

(71) Applicant: MStar Semiconductor, Inc., Hsinchu Hsien (TW)

(72) Inventors: Kai-Ting Ho, Zhubei (TW); Chien-Chuan Chen, Zhubei (TW); Wen-Ho Chen, Zhubei (TW); Chi-An Jen, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 153 days.

(21) Appl. No.: 15/147,955

(22) Filed: May 6, 2016

(65) Prior Publication Data

US 2016/0328087 A1    Nov. 10, 2016

(30) Foreign Application Priority Data

May 8, 2015   (TW) .............................. 104114698 A

(51) Int. Cl.
G06F 3/041    (2006.01)
G06F 3/044    (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

2012/0007813 A1    1/2012    Chae et al.

OTHER PUBLICATIONS

TIPO Office Action, dated Apr. 28, 2016, 8 pages.

*Primary Examiner* — Nicholas Lee
(74) *Attorney, Agent, or Firm* — Edell, Shapiro & Finnan, LLC

(57) ABSTRACT

A portable electronic device includes a touch sensing circuit, a substrate, a conductive layer on the substrate, a resistance measuring circuit and a control circuit. The conductive layer includes a plurality of sensing electrodes. The touch sensing circuit determines whether a touch point occurs according to a plurality of capacitance changes of the plurality of sensing electrodes. The resistance measuring circuit measures a resistance value of at least a part of the conductive layer. The control circuit determines whether the touch sensing circuit should enter a correction mode according to the resistance value.

18 Claims, 4 Drawing Sheets

PORTABLE ELECTRONIC DEVICE AND TOUCH CONTROL CHIP AND TOUCH CONTROL METHOD THEREOF

This application claims the benefit of Taiwan application Serial No. 104114698, filed May 8, 2015, the subject matter of which is incorporated herein by reference.

BACKGROUND OF THE INVENTION

Field of the Invention

The invention relates in general to a portable electronic device, and more particularly, to a touch sensing circuit of a portable electronic device.

Description of the Related Art

Operating interfaces of recent electronic products have become increasingly user-friendly and intuitive with the progressing technology. For example, through a touch screen, a user can directly interact with applications and input messages/texts/patterns with fingers or a stylus, thus eliminating complexities associated with other input devices such as a keyboard or buttons. A touch screen usually comprises a transparent sensing panel and a display panel disposed at the back of the sensing panel. According to a user touch position on the sensing panel and a currently displayed image on the display panel, an electronic apparatus determines an intention of the touch to execute corresponding operations.

Conventional touch sensing technologies can be roughly categorized into resistive, capacitive, electromagnetic sensing, ultrasonic and optical types. Among the above, capacitive touch technologies are most commonly applied in portable electronic devices. In self-capacitive touch technologies, the position of a touch point is determined according to a capacitance change in a sensing electrode caused by a user touch. In general, each sensing electrode has a background capacitance value when not touched by a user. The capacitance change refers to a difference between the capacitance value caused by the user and the background capacitance value. Ideally, the background capacitance value should remain substantially unchanged. However, in real situations, at the instant of a significant change in the ambient temperature, the background capacitance value frequently significantly changes. Before the background capacitance value is corrected, a backend circuit may mistake a point that is not touch as a touch point or a user touch point as a point that is not touched, hence triggering an unintended operation result.

FIG. 1 shows an example of a background capacitance change. Before the time point t1, the background capacitance value of a sensing electrode is "a". Assuming that, when a capacitance value of a sensing electrode is detected as higher than the background capacitance value and the difference between the two is higher than a predetermined value $\Delta$, a backend circuit is configured to determine that the sensing electrode receives a user touch. In the above situation, if the capacitance value of one sensing electrode is higher than the capacitance threshold b shown in FIG. 1, the backend circuit determines that the sensing electrode receives a user touch. After the time point t1, due to a drastic change in the ambient temperature of the electronic device, the background capacitance value of the sensing electrode also starts rising, becomes stable at the time point t2 and is then kept at "c". As seen from FIG. 1, even when the sensing electrode is not touched by the user, the backend circuit may still misjudge that the sensing electrode receives a continual user touch as the capacitance value of the sensing electrode is higher than the capacitance threshold b.

SUMMARY OF THE INVENTION

The invention is directed to a portable electronic device and a control method thereof. Using a property of indium tin oxide (ITO) having a resistance value that changes with the environment, the portable electronic device, and the touch sensing chip and control method thereof determine whether a touch sensing circuit should enter a correction mode by measuring a resistance value of a conductive layer, thereby preventing an incorrect sensing result.

A portable electronic device is provided according to an embodiment of the present invention. The portable electronic device includes a touch sensing circuit, a substrate, a conductive layer, a resistance measuring circuit and a control circuit. The conductive layer is on the substrate, and includes a plurality of sensing electrodes. The touch sensing circuit determines whether a touch point occurs according to a plurality of capacitance changes of the plurality of sensing electrodes. The resistance measuring circuit measures a resistance value of at least a part of the conductive layer. The control circuit determines whether the touch sensing circuit should enter a correction mode according to the resistance value.

A control method for a portable electronic device is provided according to another embodiment of the present invention. The portable electronic device includes a touch sensing circuit, a substrate, and a conductive layer formed on the substrate. The conductive layer includes a plurality of sensing electrodes. The touch sensing circuit determines whether a touch point occurs according to a plurality of capacitance changes of the plurality of sensing electrodes. The control method includes measuring a resistance value of at least a part of the conductive layer, and determining whether the touch sensing circuit should enter a correction mode according to the resistance value.

A touch sensing chip for a portable electronic device is provided according to another embodiment of the present invention. The portable electronic device includes a touch sensing circuit, a substrate, and a conductive layer formed on the substrate. The touch sensing chip includes a touch sensing circuit, a resistance measuring circuit and a control circuit. The touch sensing circuit determines whether a touch point occurs according to a plurality of capacitance changes of the plurality of sensing electrodes. The resistance measuring circuit measures a resistance value of at least a part of the conductive layer. The control circuit determines whether the touch sensing circuit should enter a correction mode according to the resistance value.

The above and other aspects of the invention will become better understood with regard to the following detailed description of the preferred but non-limiting embodiments. The following description is made with reference to the accompanying drawings.

Figure 1:
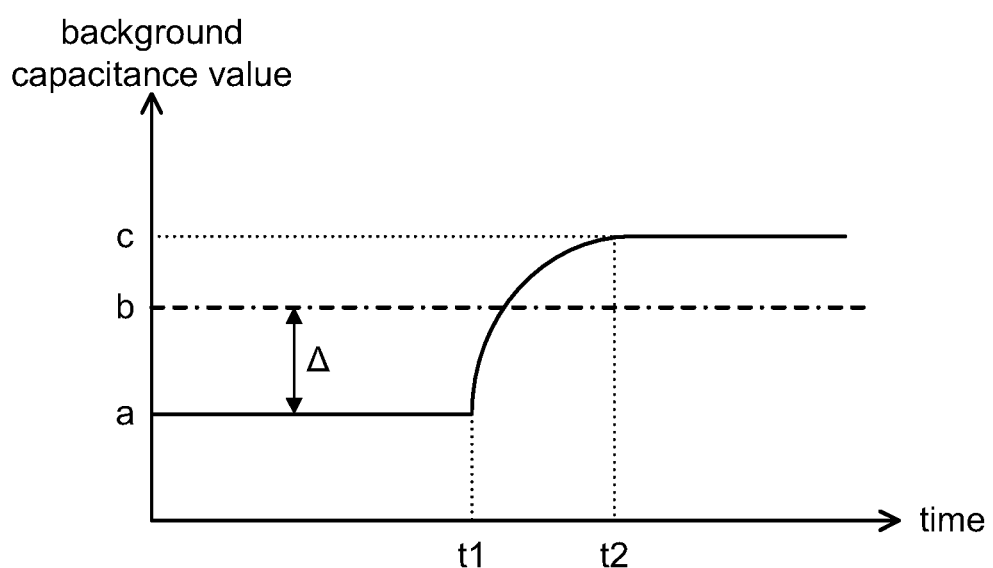
FIG. 1 is an exemplary pattern of a background capacitance change of a sensing electrode.

It should be noted that, the drawings of the present invention include functional block diagrams of multiple functional circuits related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 2:
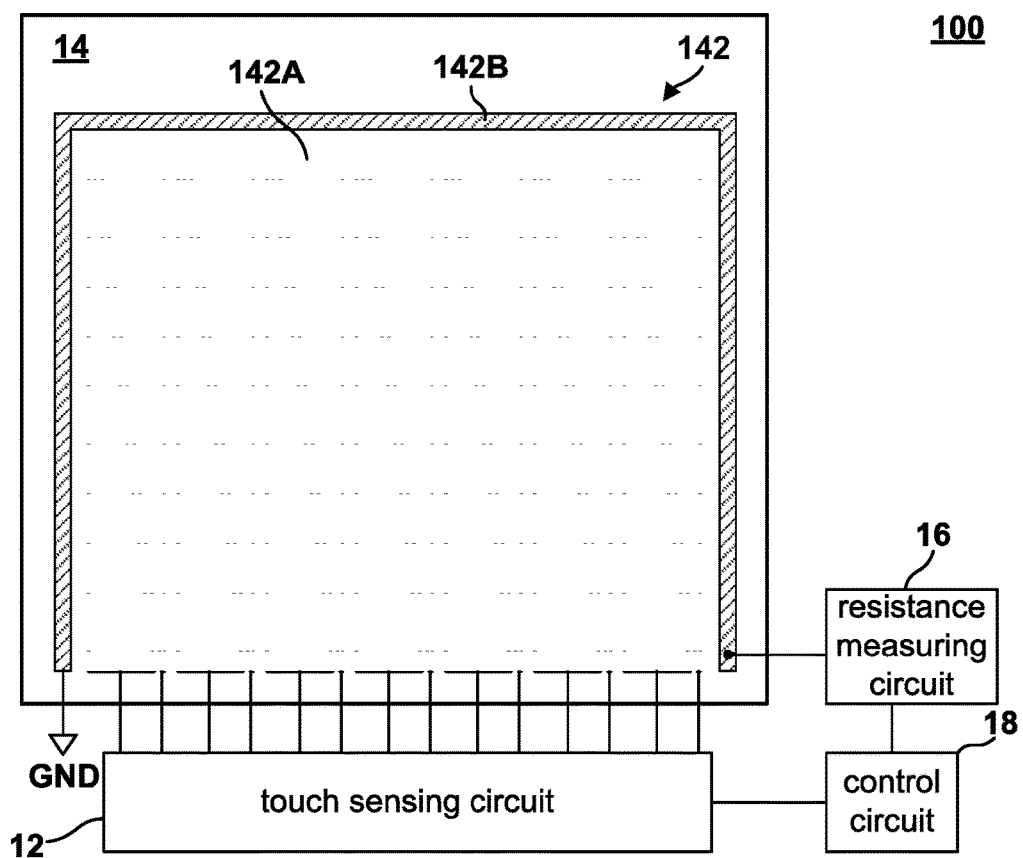
FIG. 2 is a block diagram of a portable electronic device according to an embodiment of the present invention.

FIG. 2 shows a block diagram of a portable electronic device is provided according an embodiment of the present invention. Referring to FIG. 2, a portable electronic device 100 includes a touch sensing circuit 12, a substrate 14, a resistance measuring circuit 16 and a control circuit 18. The touch sensing circuit 12, the resistance measuring circuit 16 and the control circuit 18 may be implemented by a touch sensing chip. In practice, for example but not limited to, the portable electronic device 100 may be an electronic device such as a tablet computer, a smart phone, a game console, a wearable device having a touch function.

An indium tin oxide (ITO) structure 142 is formed on the substrate 14. In the embodiment, the ITO structure 142 includes a plurality of sensing electrodes 142A coordinating with the touch sensing circuit 12 and a guard ring 142B (the shaded part) surrounding the sensing electrodes 142A. One end of the guard ring 142B is connected to the ground terminal GND to reduce the interference of the sensing electrodes 142A from nearby circuits. The touch sensing circuit 12 determines a position of a user touch according to capacitance changes of the sensing electrodes 142A. It should be noted that, the number and shape of the sensing electrodes 142A in FIG. 2 are merely examples and shall not be construed as limitations of the present invention. Further, based on following description, one person skilled in the art can understand that, the electrode configuration of self-capacitive touch sensing circuit in FIG. 2 is used as an example, and the concept of the present invention is also applicable to a mutual capacitive touch sensing circuit.

The resistance measuring circuit 16 measures a resistance value of the ITO structure 142. In the embodiment, the measuring target of the resistance measuring circuit 16 is the resistance value of the guard ring 142B. For example, the resistance measuring circuit 16 includes a current source (not shown), inputs a constant current from one end of the guard ring 142B connected with the resistance measuring circuit 16, and measures the voltage value of the current input end to further calculate the resistance value of the guard ring 142B. In practice, for example but not limited to, the resistance measuring circuit 16 may convert the measured voltage value to a resistance value through a look-up table (LUT) or through calculation. In another embodiment, instead of the guard ring 142B, which further provides the above-mentioned guarding function, the measuring target of the resistance measuring circuit 16 can also be an ITO block exclusively provided for such resistance measurement.

One property of ITO is that, its resistance changes with the environment. For example, when the ambient temperature rises, the resistance value of ITO increases. Accordingly, the control circuit 18 may selectively adjust the operation mode of the touch sensing circuit 12. However, in addition to ITO, the scope of the present invention further encompasses any conductive layer having the above property. It should be noted that, the resistance measuring circuit 16 needs not to accurately measure the resistance value, and the control circuit 18 may adjust the operation mode of the touch sensing circuit 12 only according to a relative change in the resistance value. Several examples are given below for illustrating adjustment methods that the control circuit 18 applies on the touch sensing circuit 12.

In one embodiment, when the resistance value obtained by the resistance measuring circuit 16 substantially satisfies a significant change condition, the control circuit 18 causes the touch sensing circuit 12 to enter a correction mode. For example, when the control circuit 18 learns that the resistance value of the guard ring 142B is significantly reduced to a half of a reference resistance value within a short period (e.g., 1 ms), the control circuit 18 may conclude that the portable electronic device 100 may be moved from a warm environment to a cold environment by a user. In the above situation, the control circuit 18 may request the touch sensing circuit 12 to enter the correction mode, and re-evaluate whether a capacitance threshold of a touch point occurs. Associated details are given below.

Figure 3:
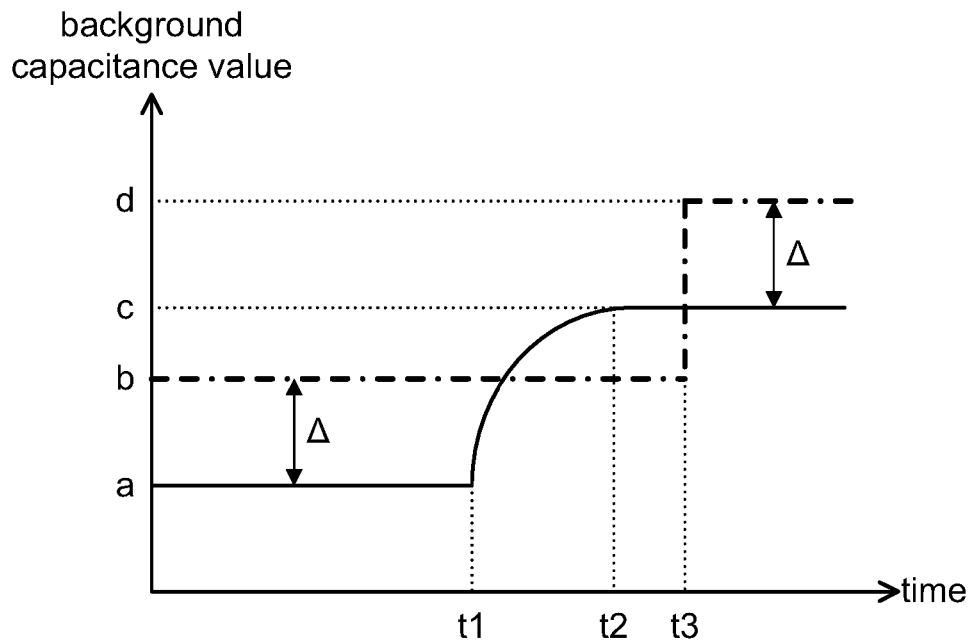
FIG. 3 is an exemplary relationship between a detection threshold of a touch point and a background capacitance change according to the present invention.

FIG. 3 shows an exemplary pattern of a background capacitance change. Before the time point t1, the background capacitance value of the sensing electrode is "a". Assuming that, when a capacitance value of a sensing electrode is detected as higher than the background capacitance value and a difference between the two is higher than a predetermined value Δ, the touch sensing circuit 12 is configured to determine that the sensing electrode receives a touch user. At this time, if the capacitance value of a sensing electrode is higher than the capacitance threshold Δ shown in FIG. 1, the touch sensing circuit 12 determines that the sensing electrode receives a user touch. After the time point t1, the background capacitance value of the sensing electrode rises due to the change in the ambient temperature. If the original and uncorrected background capacitance value a and the corresponding capacitance threshold b are used to evaluate the position of the user touch, even if the user does not touch the portable electronic device 100 at all, the touch sensing circuit 12 may still determine that the user simultaneously pressed multiple positions such that a back-end circuit may be driven to perform an erroneous operation. According to the present invention, after the time point t1, if the measured result of the resistance measuring circuit 16 indicates that the ambient temperature is significantly changed, the control circuit 18 then requests the touch sensing circuit 12 to re-evaluate to accordingly determine whether the capacitance threshold of a touch point occurs. In practice, the touch sensing circuit 12 may re-evaluate the background capacitance value of the sensing electrode, and re-determine whether a capacitance threshold d of a touch point occurs according to a new background capacitance value c after the background capacitance of the sensing electrode is again approximately stable (e.g., substantially maintained at the capacitance value c). A difference between the capacitance threshold d and the background capacitance value c may also be equal to the predetermined value Δ. After the time point t3, only when the capacitance value of a sensing electrode is detected as higher than the capacitance threshold d, the touch sensing circuit 12 then determines that the sensing electrode is touched by a user.

In another embodiment, in addition to causing the touch sensing circuit 12 to enter the correction mode, when the resistance measuring circuit 16 learns that the resistance value measured satisfies a significant change condition, the control circuit 18 further causes the sensing result outputted from the touch sensing circuit 12 to be omitted, or to cause the touch sensing circuit 12 to stop outputting the sensing result, until the touch sensing circuit 12 completes the correction operation. Taking the exemplary pattern of the capacitance change in FIG. 3 for example, when the measured result of the resistance measuring circuit 16 indicates that a significant change occurs in the ambient temperature (may be later than the time point t1), the control circuit 18 may cause the sensing result outputted from the touch sensing circuit 12 to be temporarily omitted, or to cause the touch sensing circuit 12 to stop outputting the touch sensing result. Only when the touch sensing circuit 12 selects the new capacitance threshold d, the control circuit 18 again causes the touch sensing circuit 12 to output the sensing result, or to stop omitting the sensing result from the touch sensing circuit 12.

In one embodiment, the resistance measuring circuit 16 periodically measures the resistance value of the guard ring 142B for the reference of the control circuit 18. In another embodiment, each time the touch sensing circuit 12 detects an abnormal touch pattern (e.g., when the touch sensing circuit 12 determines a large amount of touch points occur instantaneously), the resistance measuring circuit 16 starts measuring the resistance value of the guard ring 142B.

In practice, the control circuit 18 may be implemented by various control and processing platforms, including fixed and programmable logic circuits, including programmable logic gate arrays, application specific integrated circuits (ASIC), microcontrollers, microprocessors, digital signal processors (DSP), or other necessary circuits. Alternatively, the controller may be designed to complete various tasks through executing processor commands stored in a memory (not shown).

It should be noted that, details of the sensing method of the touch sensing circuit 12 and the resistance measuring method of the resistance measuring circuit 16 are generally known to one person skilled in the art, and shall be omitted herein.

In an actual environment, a drastic change in the temperature within a short period frequently leads to a humidity change around the device. For example, when the portable device 100 is taken into an air-conditioned room from a hot outdoor environment, the humidity difference between the two environments may cause vapor condensation on the surface of the portable electronic device 100. Compared to a humidity-free situation, when moisture occurs between a user finger and the sensing electrode 142A, the self capacitance value detected by the touch sensing circuit 12 is greater. It is thus known that, if the humidity is too high, the touch sensing circuit 12 may also misjudge that one or multiple positions on the touch surface of the portable electronic device 100 are pressed by a user even when the user does not at all touch the sensing electrode 12A. In one embodiment, after it is determined whether to cause the touch sensing circuit 12 to enter the correction mode according to the output signal of the resistance measuring circuit 16, the control circuit 18 further detects the mutual capacitance value between any two sensing electrodes 142A. Compared to a vapor-free situation, the mutual capacitance value between any two sensing electrodes 142A is higher.

The control circuit 18 may determine whether to cause the touch sensing circuit 12 to enter a mist mode according to whether the mutual capacitance value of the sensing electrodes 142A is too high. When the touch sensing circuit 12 is in the mist mode, the self capacitance threshold for determining whether a touch point occurs may be increased to accordingly prevent a misjudged touch point caused by mist. Details of a device and method for measuring the mutual capacitance value between any two sensing electrodes 142 are generally known to one person skilled in the art, and shall be omitted herein.

In one embodiment, the self capacitance threshold according to which the touch sensing circuit 12 determines whether a touch point occurs is a fixed predetermined value. In another embodiment, when the touch sensing circuit 12 is in the mist mode, the control circuit 18 may constantly and dynamically adjust the self capacitance threshold according to the self capacitance values of the sensing electrodes 142A. For example, after the touch sensing circuit 12 enters the mist mode, the self capacitance threshold may be first adjusted to a predetermined value T1. If the control circuit 18 later discovers that the sensing result outputted from the touch sensing circuit 12 reflects an excessive number of unreasonable touch points, it means that the vapor condensation at the surface of portable electronic device 100 is rather severe. Thus, the control circuit 18 may cause the self-capacitance threshold to be increased to T2 (higher than T1).

Figure 4:
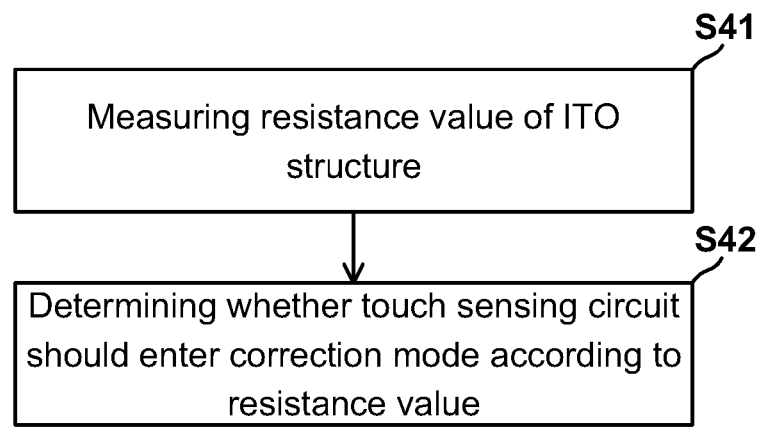
FIG. 4 is a flowchart of a control method for a portable electronic device according to an embodiment of the present invention.

A control method for a portable electronic device is further provided according to another embodiment of the present invention. FIG. 4 shows a flowchart of a process of the control method. The portable electronic device includes a touch sensing circuit, and an ITO structure on the substrate. The ITO structure includes a plurality of sensing electrodes. The touch sensing circuit determines whether a touch point occurs according to a plurality of capacitance values of the plurality of sensing electrodes. In step S41, a resistance value of the ITO structure is measured. In step S42, it is determined whether the touch sensing circuit should enter a correction mode according to the resistance value.

Figure 5:
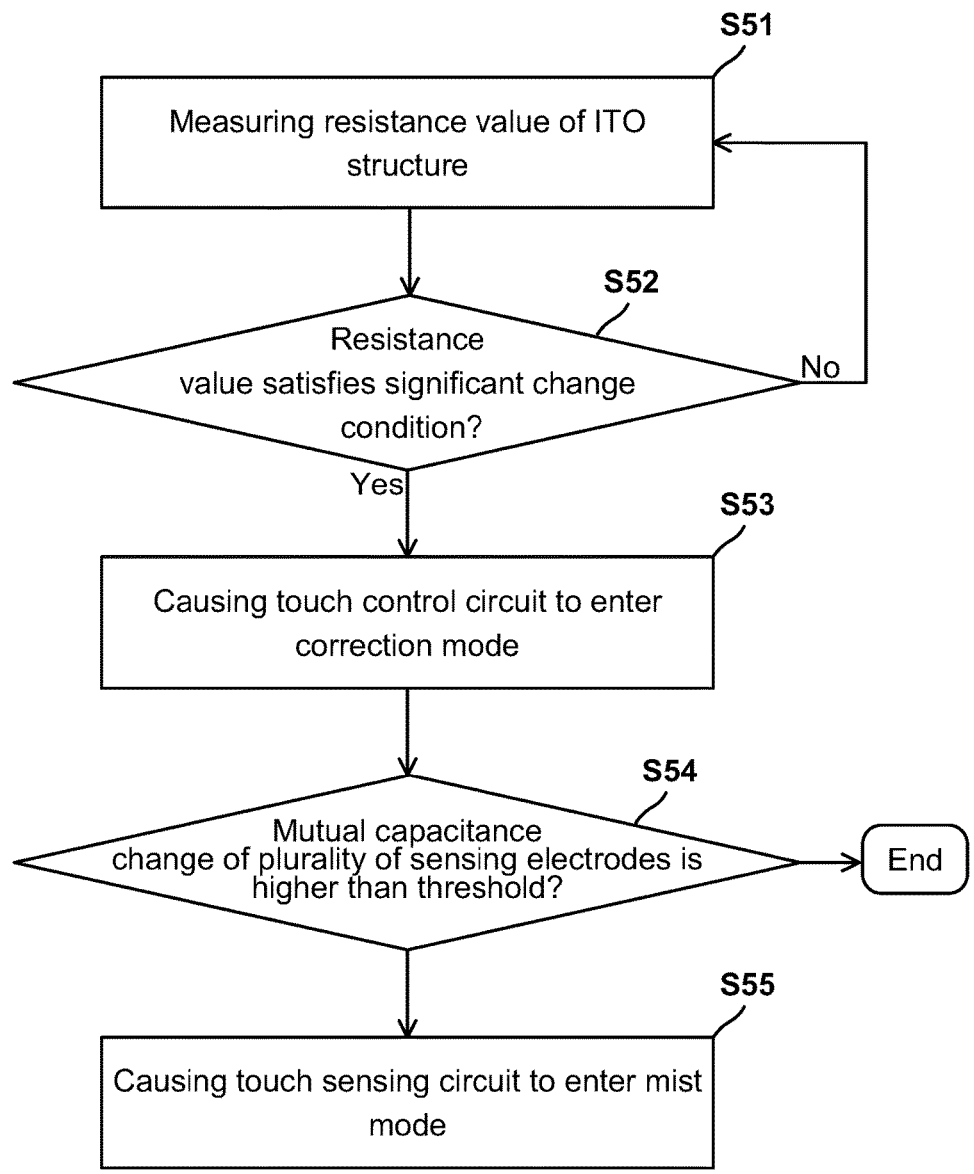
FIG. 5 is an example of detailed steps of a control method according to the present invention.

FIG. 5 shows a detailed operation example of the above control method. In step S51, a resistance value of the ITO structure is measured. In step S52, it is determined whether the resistance value satisfies a significant change condition according to the measured result of step S51. Step S51 is repeated if the determination result of step S52 is negative, or else the touch sensing circuit is configured to enter a correction mode in step S53 if the determination result of step S52 is affirmative. In step S54, it is determined whether a mutual capacitance value of the plurality of sensing electrodes is higher than a predetermined threshold. The process ends if the determination result of step S54 is negative, or else the touch sensing circuit is configured to enter a mist mode in step S55 if the determination result of step S54 is affirmative.

One person skilled in the art can understand that, the operation variations in the description associated with the portable electronic device 100 are applicable to the control method in FIG. 4 and FIG. 5, and such details shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broad-

What is claimed is:

1. A portable electronic device, comprising:
   a substrate;
   a conductive layer, formed on the substrate, comprising a plurality of sensing electrodes;
   a touch sensing circuit, determining whether a touch point occurs according to a plurality of capacitance changes of the plurality of sensing electrodes;
   a resistance measuring circuit, measuring a resistance value of at least a part of the conductive layer; and
   a control circuit, determining whether the touch sensing circuit should enter a correction mode according to the resistance value,
   wherein when the touch sensing circuit enters the correction mode, the control circuit causes at least one sensing result outputted by the touch sensing circuit to be omitted or to cause the touch sensing circuit to stop outputting the sensing result.

2. The portable electronic device according to claim 1, wherein the resistance measuring circuit periodically measures the resistance value of the conductive layer.

3. A portable electronic device, comprising:
   a substrate;
   a conductive layer, formed on the substrate, comprising a plurality of sensing electrodes;
   a touch sensing circuit, determining whether a touch point occurs according to a plurality of capacitance changes of the plurality of sensing electrodes;
   a resistance measuring circuit, measuring a resistance value of at least a part of the conductive layer; and
   a control circuit, determining whether the touch sensing circuit should enter a correction mode according to the resistance value,
   wherein each time the touch sensing circuit detects an abnormal touch pattern, the resistance measuring circuit starts measuring the resistance value of the conductive layer.

4. The portable electronic device according to claim 1, wherein when the resistance value satisfies a significant change condition, the control circuit causes the touch sensing circuit to enter the correction mode.

5. The portable electronic device according to claim 1, wherein in the correction mode, the control circuit requests the touch sensing circuit to re-evaluate a capacitance threshold for determining whether a touch point occurs.

6. The portable electronic device according to claim 1, wherein the control circuit further determines whether to cause the touch sensing circuit to enter a mist mode according to a mutual capacitance value of the plurality of sensing electrodes.

7. The portable electronic device according to claim 6, wherein when the touch sensing circuit enters the mist mode, a capacitance threshold for determining whether a touch point occurs is increased.

8. The portable electronic device according to claim 6, wherein when the touch sensing mode enters the mist mode, the control circuit dynamically adjusts a capacitance threshold according to which the touch sensing circuit determines whether a touch point occurs according to the plurality of capacitance values of the plurality of sensing electrodes.

9. The portable electronic device according to claim 1, wherein the conductive layer comprises a guard ring surrounding the sensing electrodes, and the resistance measuring circuit measures a resistance value of the guard ring.

10. The portable electronic device according to claim 1, wherein the conductive layer is an indium tin oxide (ITO) structure.

11. A control method, applied to a portable electronic device comprising a touch sensing circuit and a conductive layer, the conductive layer comprising a plurality of sensing electrodes, the touch sensing circuit determining whether a touch point occurs according to a plurality of capacitance changes of the plurality of sensing electrodes, the control method comprising:
   a) measuring a resistance value of at least a part of the conductive layer;
   b) determining whether the touch sensing circuit should enter a correction mode according to the resistance value; and
   determining whether to cause the touch sensing circuit to enter a mist mode according to a mutual capacitance value of the plurality of sensing electrodes.

12. The control method according to claim 11, wherein step (a) is periodically performed.

13. The control method according to claim 11, wherein each time the touch sensing circuit detects an abnormal touch pattern, step (a) is performed.

14. The control method according to claim 11, wherein step (b) comprises:
   causing the touch sensing circuit to enter the correction mode when the resistance value satisfies a significant change condition.

15. The control method according to claim 11, further comprising:
   in the correction mode, re-evaluating a capacitance threshold according to which the touch sensing circuit determines whether a touch point occurs.

16. The control method according to claim 11, further comprising:
   in the correction mode, causing at least one sensing result outputted by the touch sensing circuit to be omitted or causing the touch sensing circuit to stop outputting the sensing result.

17. The control method according to claim 11, further comprising:
   when the touch sensing circuit enters the mist mode, increasing a capacitance threshold for determining whether a touch point occurs.

18. The control method according to claim 11, further comprising:
   when the touch sensing circuit enters the mist mode, dynamically adjusting a capacitance threshold according to which the touch sensing circuit determines whether a touch point occurs according to the plurality of capacitance values of the plurality of sensing electrodes.

* * * * *